(12) United States Patent
Robinson

(10) Patent No.: US 8,434,306 B2
(45) Date of Patent: May 7, 2013

(54) VEHICULAR ENGINE HAVING TURBOCHARGER AND VEHICLE INCLUDING SAME

(75) Inventor: James S. Robinson, Delaware, OH (US)

(73) Assignee: Honda Motor Co., Ltd., Tokyo (JP)

(*) Notice: Subject to any disclaimer, the term of this patent is extended or adjusted under 35 U.S.C. 154(b) by 230 days.

(21) Appl. No.: 13/035,277

(22) Filed: Feb. 25, 2011

(65) Prior Publication Data

US 2012/0216528 A1 Aug. 30, 2012

(51) Int. Cl.
*F02B 33/44* (2006.01)
*F02B 33/00* (2006.01)

(52) U.S. Cl.
USPC ........... 60/611; 60/612; 60/605.1; 123/562

(58) Field of Classification Search .................... 60/612, 60/611, 605.1; 123/562
See application file for complete search history.

(56) References Cited

U.S. PATENT DOCUMENTS

| | | | |
|---|---|---|---|
| 2,199,259 A | 4/1940 | Hersey | |
| 4,457,134 A | 7/1984 | Deutschmann | |
| 5,154,058 A | 10/1992 | Mizuno | |
| 5,277,029 A | 1/1994 | Kidokoro et al. | |
| 6,397,598 B1 | 6/2002 | Pierpont | 60/612 |
| 6,408,625 B1 | 6/2002 | Woon et al. | |
| 6,684,630 B2 | 2/2004 | Uchida et al. | |
| 6,715,289 B2 | 4/2004 | Mader et al. | |
| 7,380,540 B1 | 6/2008 | Duffy et al. | |
| 7,448,205 B2 | 11/2008 | Takahashi et al. | |
| 7,540,150 B2 | 6/2009 | Schmid et al. | 60/612 |
| 7,621,126 B2 | 11/2009 | Kolmanovsky et al. | |
| 2007/0295001 A1 | 12/2007 | Newman | |
| 2008/0216788 A1 | 9/2008 | Henrich et al. | |
| 2009/0064677 A1* | 3/2009 | Farmer | 60/612 |
| 2009/0077965 A1* | 3/2009 | Pursifull | 60/602 |
| 2009/0107140 A1* | 4/2009 | Pursifull | 60/612 |
| 2009/0211246 A1 | 8/2009 | McEwan et al. | |

FOREIGN PATENT DOCUMENTS

| JP | 5005420 A | 1/1993 |
|---|---|---|
| JP | 4392689 A | 1/2010 |

OTHER PUBLICATIONS

International Search Report and Written Opinion of the International Searching Authority for International Application Serial No. PCT/US12/20894, dated May 8, 2012, 15 pages, in its entirety.

* cited by examiner

*Primary Examiner* — Thai Ba Trieu
(74) *Attorney, Agent, or Firm* — Ulmer & Berne LLP

(57) ABSTRACT

An engine comprises an intake manifold, first and second cylinder banks, a turbocharger, a flow passage, and first and second cylinder banks. The first and second cylinder banks are each in fluid communication with a respective output of the intake manifold. The turbocharger is associated with the second cylinder bank and includes a compressor input port and a compressor output port. The flow passage is in fluid communication with each of the compressor output port and an input of the intake manifold.

19 Claims, 5 Drawing Sheets

VEHICULAR ENGINE HAVING TURBOCHARGER AND VEHICLE INCLUDING SAME

TECHNICAL FIELD

A vehicle includes an engine, a controller, and first and second forced induction devices. The controller is configured to facilitate operation of the engine between a standard mode and an economy mode.

BACKGROUND

Conventional engines include a pair of cylinder banks and two turbochargers. One of the cylinder banks can be selectively disabled to facilitate operation of the engine in an economy mode. When the cylinder bank is disabled, pressurized air from one turbocharger can backfeed into the other turbocharger and can affect operation of the engine.

SUMMARY

In accordance with one embodiment, an engine comprises an intake manifold, a first cylinder bank, a second cylinder bank, a first turbocharger, a second turbocharger, a flow passage, a bypass flow passage, a first valve, and a second cylinder bank. The first cylinder bank is in fluid communication with an output of the intake manifold. The second cylinder bank is in fluid communication with an output of the intake manifold. The first turbocharger is associated with the first cylinder bank and is in fluid communication with each of an ambient air source and an input of the intake manifold. The second turbocharger is associated with the second cylinder bank and includes a compressor input port and a compressor output port. The compressor input port is provided in fluid communication with an ambient air source. The flow passage is in fluid communication with each of the compressor output port and an input of the intake manifold. The bypass flow passage is in fluid communication with each of the compressor input port and an input of the intake manifold. The first valve is disposed at least partially within the flow passage and is movable between an opened position and a closed position. The second valve is disposed at least partially within the bypass flow passage and is movable between an opened position and a closed position.

In accordance with another embodiment, a method for operating an engine is provided. The engine comprises a first cylinder bank, a second cylinder bank, and a turbocharger. The engine is selectively and alternatively operable in a standard mode and an economy mode. The method comprises operating the first cylinder bank, regardless of whether the engine is operating in the standard mode or the economy mode. The method further comprises operating the second cylinder bank when the engine is operating in the standard mode and disabling the second cylinder bank when the engine is operating in the economy mode. The method further comprises operating a spark plug associated with the second cylinder bank according to a retarded timing schedule when the engine is in process of transitioning from the economy mode to the standard mode.

In accordance with yet another embodiment, a vehicle comprises an engine and a controller. The engine comprises an intake manifold, a first cylinder bank, a first turbocharger, a second cylinder bank, a second turbocharger, a bypass flow passage, a first valve, and a second valve. The intake manifold comprises a body, a first flow passage, and a second flow passage. The body, the first flow passage, and the second flow passage are each in fluid communication with one another. The first cylinder bank comprises a plurality of first cylinders and defines a first intake port and a first exhaust port which are associated with each first cylinder. Each first intake port is in fluid communication with the body of the intake manifold. The first turbocharger comprises a first compressor input port, a first compressor output port, a first compressor, a first turbine input port, a first turbine output port, and a first turbine. The first compressor input port is in fluid communication with an ambient air source. The first compressor output port is in fluid communication with the first flow passage of the intake manifold. The first compressor is associated with the first compressor input port and the first compressor output port. The first turbine input port is in fluid communication with each first exhaust port of the first cylinder bank. The first turbine is coupled with the first compressor and is associated with the first turbine input port and the first turbine output port. The second cylinder bank comprises a plurality of second cylinders and defines a second intake port and a second exhaust port which are associated with each second cylinder. Each second intake port is in fluid communication with the body of the intake manifold. The second turbocharger comprises a second compressor input port, a second compressor output port, a second compressor, a second turbine input port, a second turbine output port, and a second turbine. The second compressor input port is in fluid communication with an ambient air source. The second compressor output port is in fluid communication with the second flow passage of the intake manifold. The second compressor is associated with the second compressor input port and the second compressor output port. The second turbine input port is in fluid communication with each second exhaust port of the second cylinder bank. The second turbine is coupled with the second compressor and is associated with the second turbine input port and the second turbine output port. The bypass flow passage is in fluid communication with the second flow passage of the intake manifold and the second compressor input port of the second turbocharger. The first valve is disposed at least partially within the second flow passage of the intake manifold and is located between the bypass flow passage and the second output port of the second turbocharger. The first valve is movable between an opened position and a closed position. The second valve is disposed at least partially within the bypass flow passage and is movable between an opened position and a closed position. The controller is coupled with each of the first valve and the second valve and is configured to operate each of the first valve and the second valve between the respective opened and closed positions.

BRIEF DESCRIPTION OF THE DRAWINGS

Various embodiments will become better understood with regard to the following description, appended claims, and accompanying drawings wherein:

DETAILED DESCRIPTION

Figure 1:
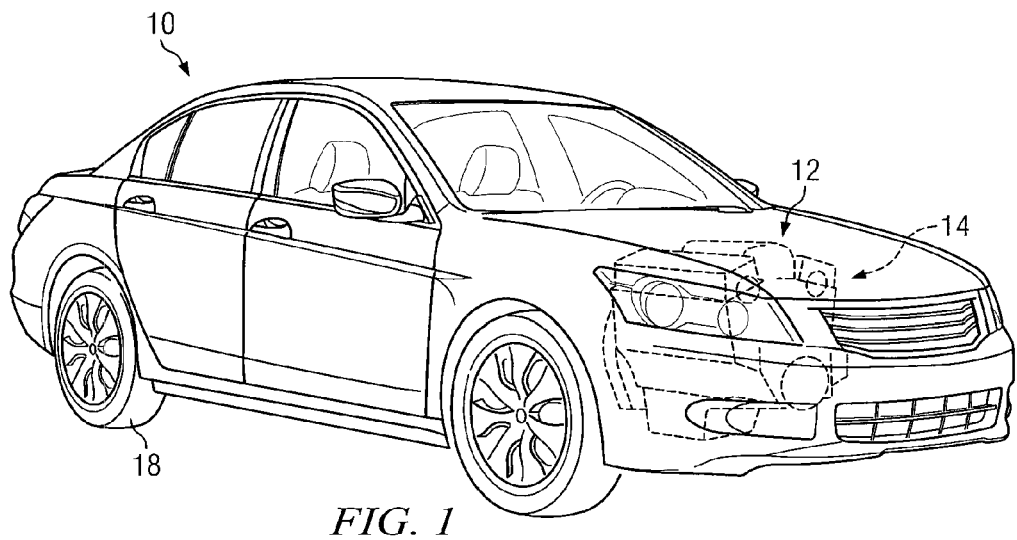
FIG. 1 is a perspective view depicting a vehicle that includes an engine.

Embodiments are hereinafter described in detail in connection with the views of FIGS. 1-8, wherein like numbers indicate the same or corresponding elements throughout the views. An engine in accordance with one embodiment can be provided in a vehicle such as, for example, an automobile, a recreational vehicle, a utility vehicle, or a water craft. In one embodiment, and as depicted in FIG. 1, a vehicle 10 can include an engine 12 that is provided within an engine compartment 14. The vehicle 10 can comprise a drivetrain (not shown) that couples the engine 12 with one or more wheels (e.g., 18) of the vehicle. The drivetrain can be coupled to the engine 12 such that power from the engine 12 can be transmitted through the drivetrain to the wheels 18 to propel the vehicle 10.

Figure 2:
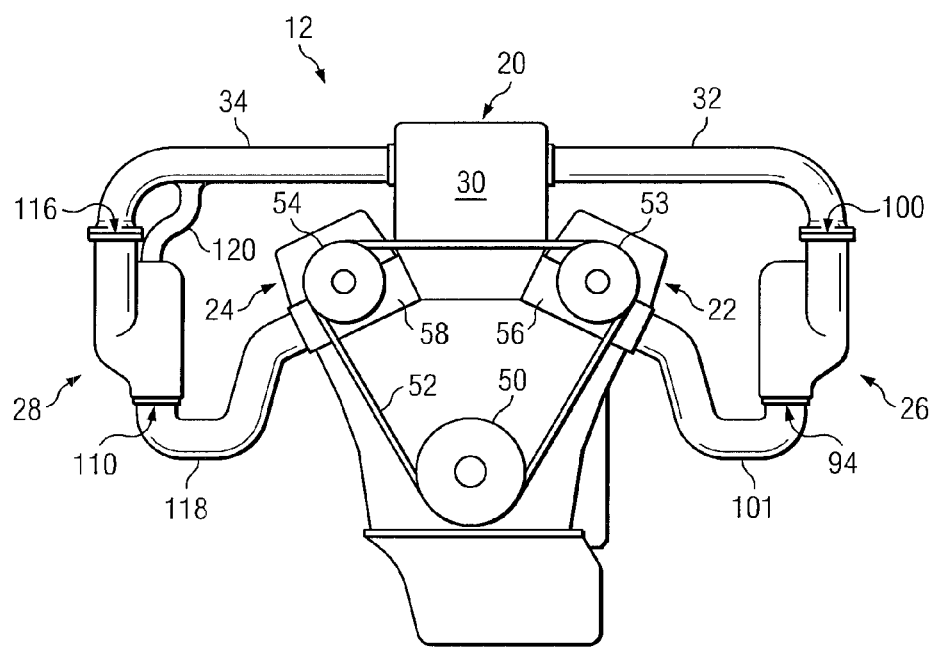
FIG. 2 is a front elevational view depicting an intake manifold, a first cylinder bank, a second cylinder bank, a first turbocharger, a second turbocharger, and certain other components of the engine of FIG. 1.
Figure 3:
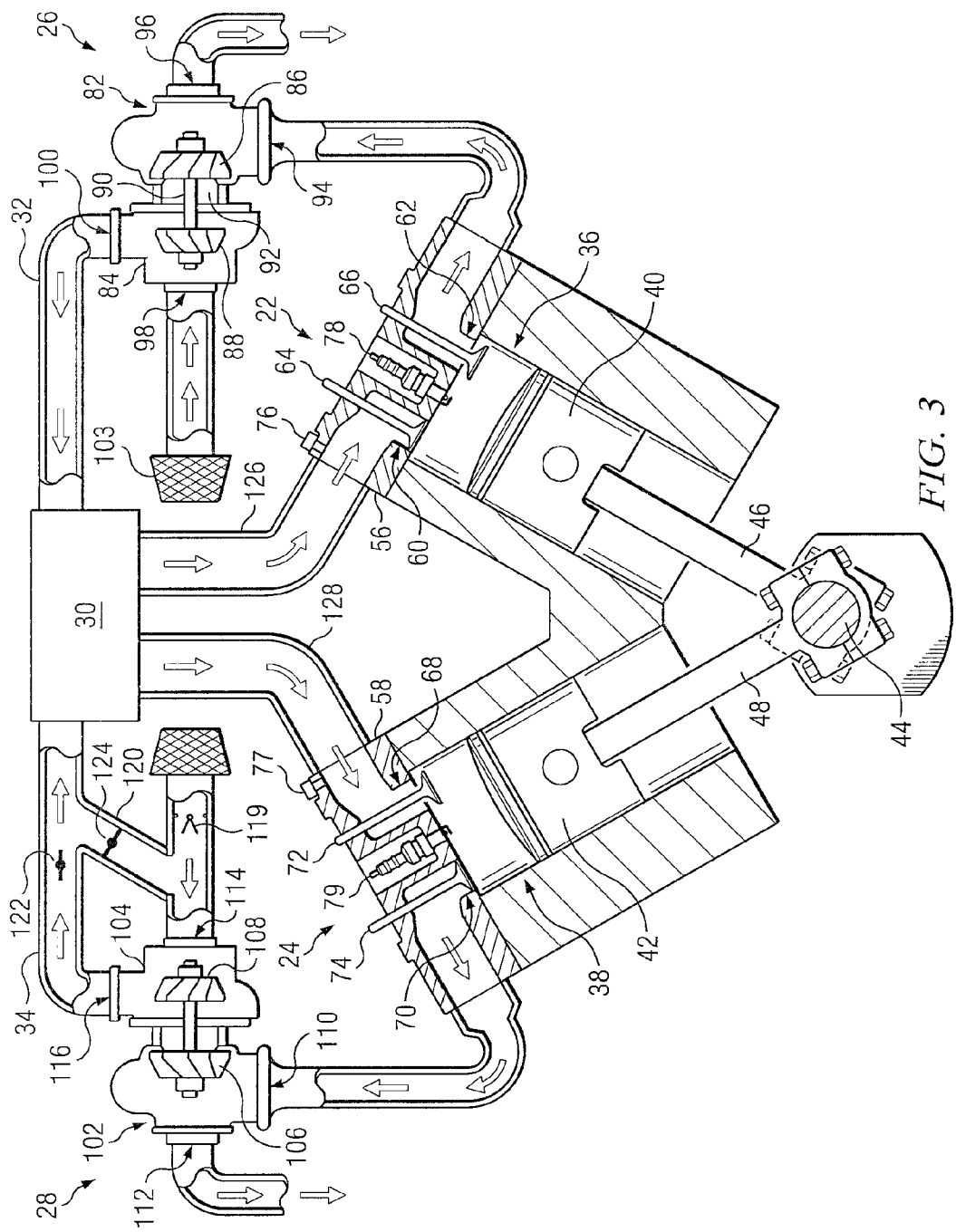
FIG. 3 is a schematic view depicting the engine of FIG. 2 having a first valve associated with a second flow passage of the intake manifold and having a second valve associated with a bypass flow passage, wherein the first valve is in an opened position and the second valve is in a closed position.

As illustrated in FIG. 2, the engine 12 can comprise an intake manifold 20, a first cylinder bank 22, a second cylinder bank 24, and first and second turbochargers 26, 28. The intake manifold 20 can include at least one input. In one embodiment, the intake manifold can include a body 30, a first flow passage 32, and a second flow passage 34. The first flow passage 32 and the second flow passage 34 can be in fluid communication with the body 30. As illustrated in FIG. 3, the first and second cylinder banks 22, 24 can include respective first and second cylinders 36, 38. Although the first and second cylinder banks 22, 24 are described herein with respect to individual first and second cylinders 36, 38, it will be appreciated that the first and second cylinder banks 22, 24 can each include a plurality of first and second cylinders that are similar in many respects to the respective first and second cylinders 36, 38 shown in FIGS. 3 and 7-8 and described below. In one embodiment, the first and second cylinder banks 22, 24 can include three first cylinders 36 and three second cylinders 38 such that the engine 12 comprises a six-cylinder engine (e.g., a V-6). In other embodiments, the engine 12 can comprise a V-4, V-8, V-10, or a V-12. It will also be appreciated that the components and features of the first and second cylinder banks 22, 24 that are described below and which accommodate the individual first and second cylinders 36, 38 can be implemented for all first and second cylinders of the first and second cylinder banks 22, 24.

A first piston 40 can be disposed at least partially within the first cylinder 36 and a second piston 42 can be disposed at least partially within the second cylinder 38. The first and second pistons 40, 42 can be coupled with a crankshaft 44 via respective connecting rods 46, 48. Movement of the first and second pistons 40, 42 within the first and second cylinders 36, 38 can rotate the crankshaft 44. One end of the crankshaft 44 can be coupled to a crankshaft pulley 50 (FIG. 2). A belt 52 or other suitable flexible transmitter (e.g., a chain) can couple the crankshaft pulley 50 to camshaft pulleys 53, 54 to facilitate operation of camshafts (not shown) during operation of the engine 12. The other end of the crankshaft 44 can be coupled with the drivetrain.

As illustrated in FIG. 3, the first and second cylinder banks 22, 24 can include respective first and second valve bodies 56, 58. The first valve body 56 can define an intake port 60 and an exhaust port 62 that are in fluid communication with the first cylinder 36. An intake valve 64 and an exhaust valve 66 can be associated with the intake port 60 and the exhaust port 62, respectively. The intake valve 64 can be movable between an opened position and a closed position (closed position shown in FIG. 3) to facilitate selective transmission of fluid from the intake port 60 into the first cylinder 36. The exhaust valve 66 can be movable between an opened position and a closed position (opened position shown in FIG. 3) to facilitate selective transmission of fluid from the first cylinder 36 to the exhaust port 62. The intake and exhaust valves 64, 66 can be movable between their respective opened and closed positions through operation of a camshaft (not shown) that can be coupled with the camshaft pulley 53 (FIG. 2).

The second valve body 58 of the second cylinder bank 24 can be similar in many respects to the first valve body 56, but instead associated with the second cylinder 38. For example, the second valve body 58 can define an intake port 68 and an exhaust port 70 that are in fluid communication with the second cylinder 38. An intake valve 72 and an exhaust valve 74 can be associated with the intake port 68 and the exhaust port 70, respectively. The intake and exhaust valves 72, 74 can be movable between respective opened and closed positions through operation of a camshaft (not shown) that can be coupled with the camshaft pulley 54 (FIG. 2).

The engine 12 can include a first fuel delivery system associated with the first cylinder 36 and a second fuel delivery system associated with the second cylinder 38. The first and second fuel delivery systems can be operable to supply fuel to the first and second cylinders 36, 38, respectively. The engine 12 can also include first and second spark plugs 78, 79 that can be operable to ignite fuel supplied to the first and second cylinders 36, 38, respectively.

In one embodiment, as illustrated in FIG. 3 the first and second fuel delivery systems can include first and second fuel injectors 76, 77. The first and second fuel injectors 76, 77 can be coupled with a fuel rail that is in fluid communication with the vehicle's fuel system (e.g., fuel pump). The first fuel injector 76 can be coupled with the first valve body 56 such that it is associated with the intake port 60. The first spark plug 78 can be coupled with the first valve body 56 such that the first spark plug 78 extends at least partially into the first cylinder 36. With the intake valve 64 opened and the exhaust valve 66 closed, the first fuel injector 76 can supply fuel (e.g., gasoline) to the first cylinder 36. Once the intake valve 64 closes, the first spark plug 78 can ignite the fuel to facilitate downward movement of the first piston 40 and resulting in rotation of the crankshaft 44. The exhaust valve 66 can then open to permit exhaust fluid to exit the exhaust port 62 (e.g., during an exhaust stroke of the first piston 40). The second fuel injector 77 and the second spark plug 79 can be similar in many respects to the first fuel injector 76 and the first spark plug 78, but associated with the second cylinder 38. In other embodiments, the fuel system and the spark plugs can be provided in any of a variety of suitable alternative configurations that facilitate supply and ignition of fuel for cylinders of an engine. For example, the fuel system can alternatively comprise a carburetor. It will be appreciated that fuel in a cylinder can alternatively be ignited without an ignition device such as through compression (e.g., a diesel engine).

Figure 4:
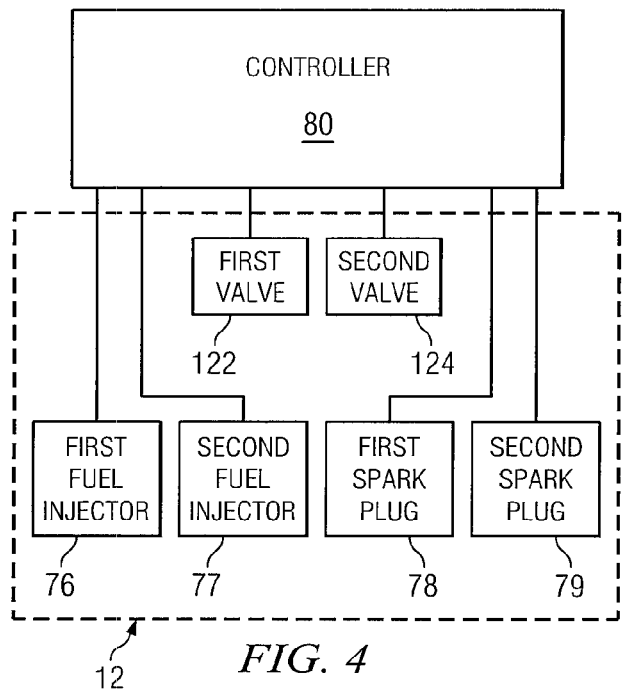
FIG. 4 is a block diagram depicting a controller in electrical communication with the engine.

As illustrated in FIG. 4, a controller 80 can be associated with the engine 12. The controller 80 can comprise an engine control unit (ECU), a power-train control module (PCM), an engine control module (ECM), or any of a variety of suitable alternative controllers for controlling operation of the engine 12. The controller 80 can be electrically coupled with the first and second fuel delivery systems (e.g., the first and second fuel injectors 76, 77) and the first and second spark plugs 78, 79. During operation of the engine 12, the controller 80 can be configured to facilitate operation of the first and second fuel delivery systems and the first and second spark plugs, 78, 79 to facilitate combustion of fuel in the first and second cylinders 36, 38.

The controller 80 can be configured to operate the first and second spark plugs 78, 79 during a compression stroke of the respective first and second pistons 40, 42. The controller 80 can control the ignition timing of the first and second spark plugs 78, 79 to facilitate effective combustion within the first and second cylinders 36, 38. More particularly, the controller 80 can facilitate operation of the first and second spark plugs 78, 79 according to the position of the first and second pistons 40, 42. In one embodiment, the controller 80 can be coupled with a crankshaft position sensor (not shown). During operation of the engine 12, the controller 80 can detect the position of the first and second pistons 40, 42 as a function of the position of the crankshaft 44 and, when the respective position of the first and second piston (e.g., 40, 42) is appropriate for ignition (e.g., 12 degrees from top dead center), the controller 80 can actuate the respective first and second spark plugs 78, 79 to ignite the fuel within the respective first and second cylinders 36, 38. It will be appreciated that the controller 80 can control the ignition timing of the first and second spark plugs 78, 79 to achieve effective fuel efficiency, engine power, and/or engine longevity, for example.

It will be appreciated that the controller 80 can vary the ignition timing of the first and second spark plugs 78, 79. In one embodiment, the controller 80 can retard the ignition timing of the first and second spark plugs 78, 79 such as during engine braking, for example. In such an embodiment, the controller 80 can variably control operation of the first and second spark plugs 78, 79 between one of a normal timing schedule and a retarded timing schedule. When the controller 80 controls the first and second spark plugs 78, 79 according to the normal timing schedule, the first and second spark plugs 78, 79 can be actuated when the respective first and second pistons 40, 42 reach a position that is appropriate for effective fuel combustion (e.g., 12 degrees from top dead center). When the controller 80 controls the first and second spark plugs according to the retarded timing schedule, the controller 80 can allow the first and second pistons 40, 42 to travel further than usual into their respective compression strokes (e.g., 5 degrees from top dead center) before actuating the first and second spark plugs 78, 79. As a result, combustion can occur later in the compression stroke of the first and second pistons 40, 42, which can retard ignition of fuel and affect the performance of the engine 12.

The first turbocharger 26 can be associated with the first cylinder bank 22 and can be in fluid communication with an input of the intake manifold. As illustrated in FIG. 3, the first turbocharger 26 can include a turbine portion 82 and a compressor portion 84. The turbine portion 82 can include a turbine 86 and the compressor portion 84 can include a compressor 88. The turbine 86 can be operably coupled with the compressor 88 by a shaft 90 that is rotatably supported by a bearing 92. In one embodiment, the shaft 90 is rigidly coupled to each of the turbine 86 and the compressor 88 such that the turbine 86 and the compressor 88 rotate together.

The turbine portion 82 can include a turbine input port 94 and a turbine output port 96 that are each in fluid communication with the turbine 86. The compressor portion 84 can include a compressor input port 98 and a compressor output port 100. The turbine input port 94 can be in fluid communication with the exhaust port 62 of the first cylinder 36. In one embodiment, as illustrated in FIGS. 2 and 3, the turbine output port 96 can be coupled with one end of an exhaust manifold 101 (e.g., with bolts). The other end of the exhaust manifold 101 can be coupled with the exhaust port 62 of the first cylinder 36 (e.g., with bolts) to facilitate fluid communication between the exhaust port 62 and the turbine input port 94 of the first turbocharger 28. The compressor input port 98 can be in fluid communication with an ambient fluid source (e.g., ambient air). In one embodiment, as illustrated in FIG. 3, an air filter 103 can be coupled with the compressor input port 98. The compressor output port 100 can be coupled with, and in fluid communication with, the first flow passage 32 of the intake manifold 20.

During operation of the engine 12, exhaust gas discharged from the exhaust port 62 can flow into the turbine input port 94 and can be discharged from the turbine output port 96. The turbine output port 96 can be coupled with a vehicular exhaust system (not shown) that facilitates discharge of exhaust fluid such as from a rear or a side of the vehicle 10. The exhaust fluid from the exhaust port 62 can facilitate rotation of the turbine 86 which can correspondingly power (e.g., rotate) the compressor 88. The compressor 88 can pressurize ambient fluid (e.g., air) supplied to the compressor input port 98. The pressurized fluid from the compressor 88 can be discharged from the compressor output port 100, can flow through the first flow passage 32 and can flow into the body 30 of the intake manifold 20. It will be appreciated that a turbine input port can be in fluid communication with an exhaust port of a valve body in any of a variety of suitable alternative configurations. For example, a turbine portion of a turbocharger can be integral with an exhaust manifold such that the turbine input port and turbine output port are disposed within and/or integral with the exhaust manifold. In such an arrangement, the exhaust manifold can be directly coupled with a vehicular exhaust system.

Figure 7:
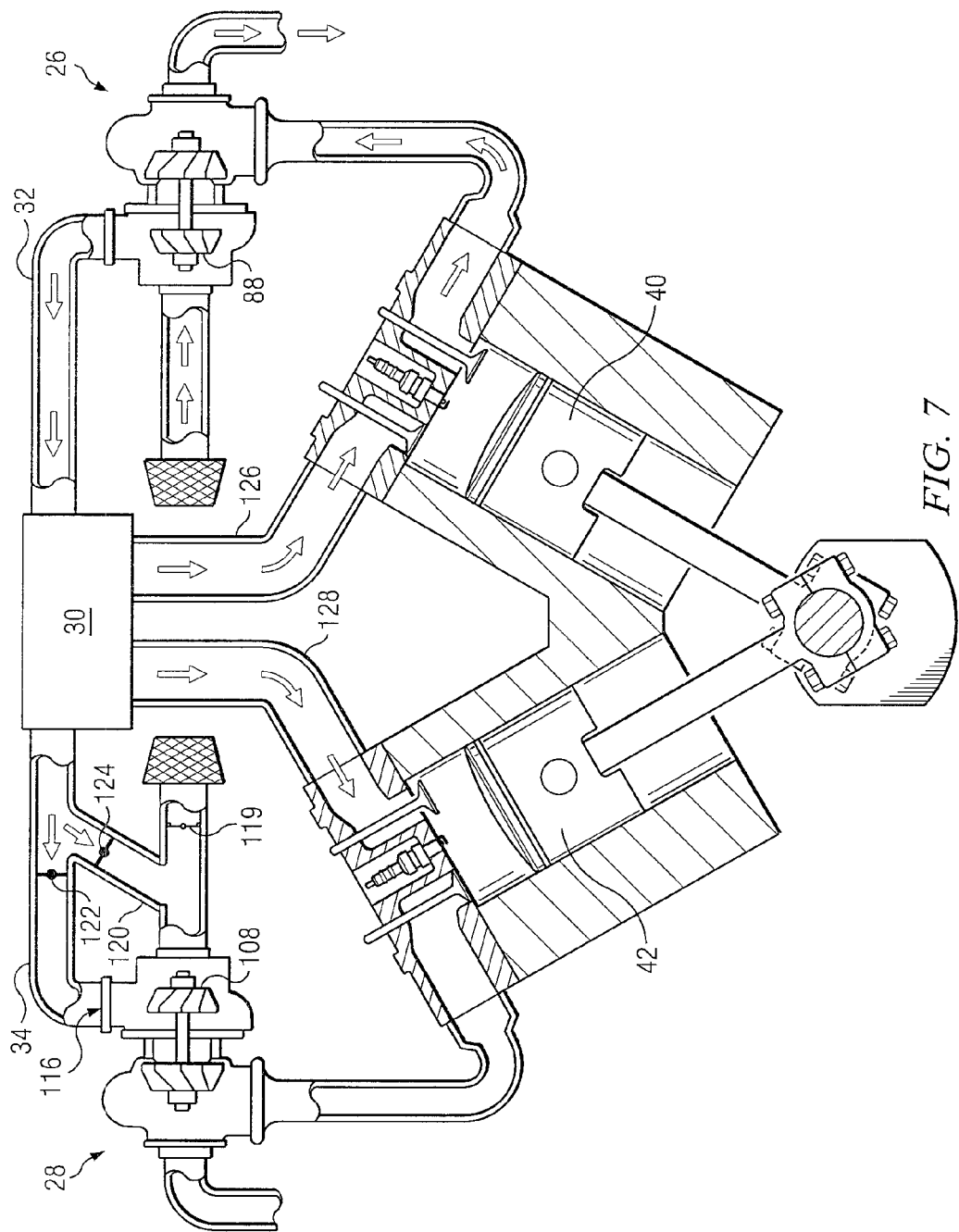
FIG. 7 is a schematic view depicting the engine of FIG. 3, but with the first valve in a closed position.
Figure 8:
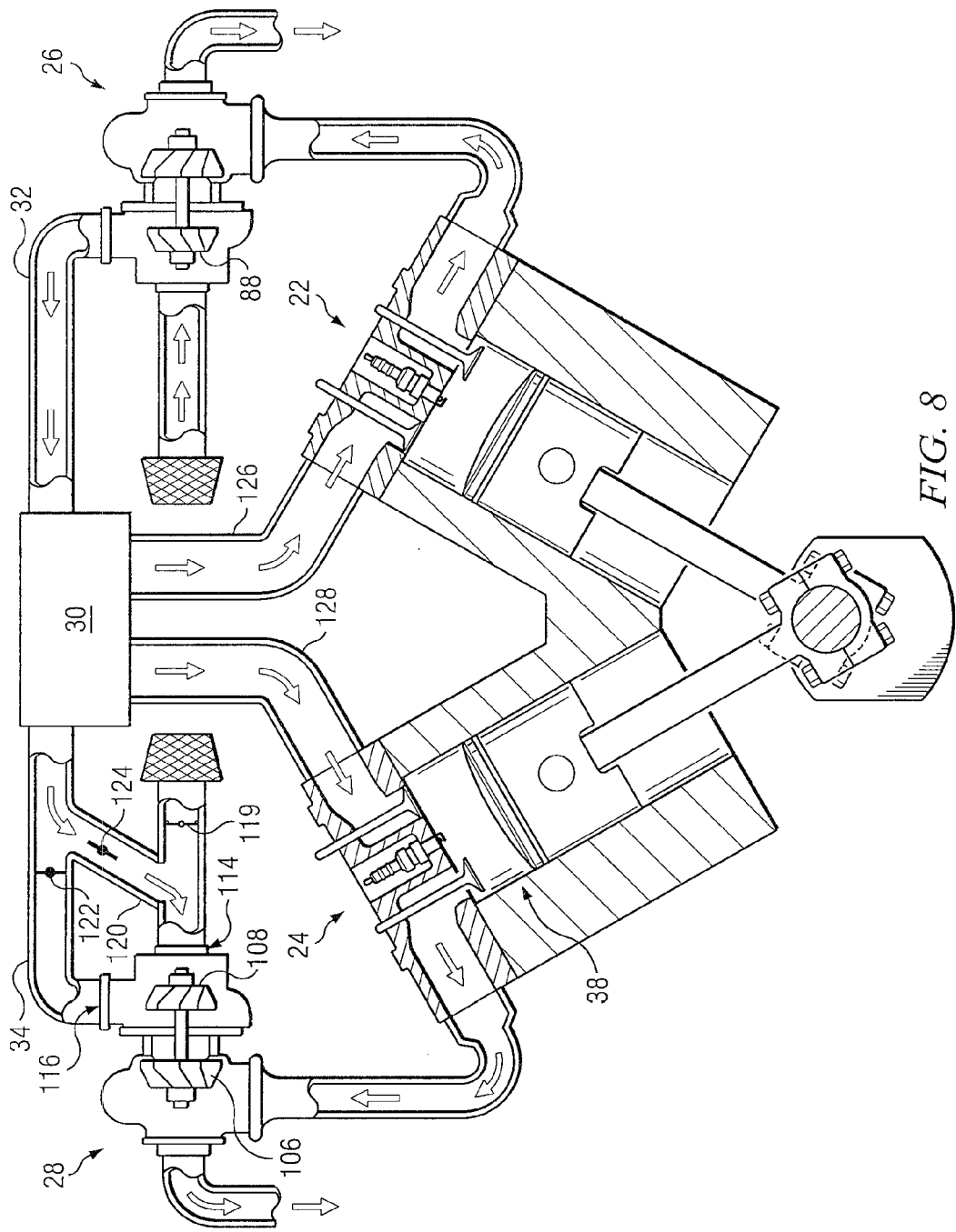
FIG. 8 is a schematic view depicting the engine of FIG. 3, but with the first valve in a closed position and the second valve moved away from the closed position.

The second turbocharger 28 can be similar in many respects to the first turbocharger 26, but instead associated with the second cylinder bank 24. For example, the second turbocharger 28 can include a turbine portion 102 that includes a turbine 106, and a compressor portion 104 that includes a compressor 108. The turbine portion 102 can include a turbine input port 110 and a turbine output port 112, and the compressor portion 104 can include a compressor input port 114 and a compressor output port 116. The turbine input port 110 can be in fluid communication with the exhaust port 70 of the second cylinder 38 by way of an exhaust manifold 118. The turbine output port 112 can be in fluid communication with a vehicular exhaust system. The compressor input port 114 can be in fluid communication with an ambient air source and can include a check valve 119. The check valve 119 can be movable between an opened position (FIG. 3) and a closed position (FIGS. 7 and 8). The check valve 119 can be biased into the closed position by a spring (not shown). The compressor output port 116 can be in fluid communication with the second flow passage 34 of the intake manifold 20. During operation of the engine 12, exhaust fluid discharged from the exhaust port 70 can flow into the turbine input port 110 to rotate the turbine 106 and power (e.g., rotate) the compressor 108. Ambient fluid can flow through the compressor input port 114 and to the compressor 108. As illustrated in FIG. 3, the ambient fluid flowing through the compressor input port 114 can move the check valve 119 into the opened position (against the biasing force of the spring).

Pressurized fluid from the compressor 108 can flow from the compressor output port 116 and into the second flow passage 34 of the intake manifold 20.

As illustrated in FIGS. 2-3 and 7-8, the engine 12 can include a bypass flow passage 120 associated with the second turbocharger 28 and in fluid communication with one of the inputs of the intake manifold 20. As illustrated in FIG. 3, the bypass flow passage 120 can extend between, and can be in fluid communication with, the second flow passage 34 and the compressor input port 114. The second flow passage 34 of the intake manifold 20 can include a first valve 122. The first valve 122 can be disposed at least partially within the second flow passage 34 and located between the compressor output port 116 and the bypass flow passage 120. The bypass flow passage 120 can include a second valve 124. The second valve 124 can be disposed at least partially within the bypass flow passage 120 and located between the second flow passage 34 and the compressor input port 114.

The first and second valves 122, 124 can each be movable, independently of one another, between respective opened and closed positions. In one embodiment, the first and second valves 122, 124 can each comprise a respective butterfly valve. In one embodiment, as illustrated in FIG. 4, the first and second valves 122, 124 can be coupled with the controller 80 (e.g., electrically, hydraulically, pneumatically, or mechanically) such that the controller 80 can facilitate movement of the first and second valves 122, 124 between the opened and closed position. When the first valve 122 is in the opened position with the second valve 124 in the closed position, as illustrated in FIG. 3, pressurized fluid from the second turbocharger 28 is free to flow through the second flow passage 34 and into the body 30 of the intake manifold 20.

The intake manifold 20 can include a plurality of outputs. The first and second cylinder banks 22, 24 can be in fluid communication with the outputs of the intake manifold 20. As illustrated in FIG. 3, the intake manifold 20 can include first and second supply passages 126, 128 that are respectively coupled with the intake ports 60, 68 of the first and second valve bodies 56, 58. During operation of engine 12, pressurized air from the first and second turbochargers 26, 28 can flow through the body 30 of the intake manifold 20 and into the intake ports 60, 68. The pressurized air can allow for turbocharging of the first and second cylinders 36, 38 (e.g., the provision of additional fuel and air into the first and second cylinders 36, 38) which can facilitate more effective power output of the engine 12.

During operation of the vehicle 10, the controller 80 can facilitate selective and alternative operation of the engine 12 between a standard mode and an economy mode. When the engine 12 is in the standard mode, each of the cylinder banks 22, 24 can be activated such that they contribute to powering of the vehicle 10. However, when the engine 12 is in the economy mode, the second cylinder bank 24 can be deactivated (e.g., by the controller 80) to facilitate conservation of fuel and energy.

Figure 5:
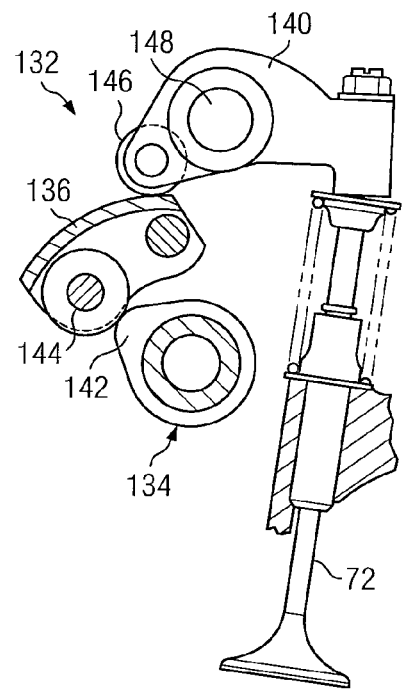
FIG. 5 is fragmentary sectional view depicting a portion of the engine of FIG. 2, in accordance with one embodiment.

In one embodiment, when the second cylinder bank 24 is deactivated, the second fuel injector 77 can be disabled to prevent fuel from being supplied to the second cylinder 38. Additionally, the second spark plug 79 can be disabled to prevent an ignition source (e.g., a spark) from being imparted to the second cylinder 38. Withholding fuel and an ignition source from the second cylinder 38 in this manner can prevent combustion which can facilitate conservation of fuel and/or energy. In another embodiment, when the second cylinder bank 24 is deactivated, a camshaft can be disabled to prevent movement of the second intake and exhaust valves 72, 74. For example, as illustrated in FIG. 5, the second cylinder bank 24 can include an overhead camshaft assembly 132 that includes a camshaft 134, a first rocker arm 136, and a second rocker arm 140. The camshaft 134 can include a drive cam 142 that can selectively contact the first rocker arm 136 during rotation of the camshaft 134. The drive cam 142 can pivot the first rocker arm 136 about a trunnion pin 144 which can cause the first rocker arm 136 to contact a cam follower 146 of the second rocker arm 140. The second rocker arm 140 can pivot about a rocker shaft 148 to actuate the intake valve 72. The camshaft assembly 132 can include a solenoid or another actuator (not shown) that is operable to selectively disengage the cam follower 146 from the second rocker arm 140. When the engine 12 operates in the economy mode, the solenoid can disengage the cam follower 146 from the second rocker arm 140 to prevent movement of the intake valve 72. It will be appreciated that, in one embodiment, a similar camshaft arrangement can be utilized for the exhaust valve 74 of the second cylinder bank 24, either when a dedicated camshaft is associated with the exhaust valve 74 (e.g., a dual overhead camshaft arrangement) or when the exhaust valve 74 is associated with the camshaft 134 (e.g., a single overhead camshaft arrangement). It will be appreciated that intake and exhaust valves can be coupled with a camshaft and selectively disabled in any of a variety of other suitable configurations.

In some embodiments, during operation of the engine 12 in the economy mode, the second piston 42 can continue to move with respect to the second cylinder 38 due to rotation of the crankshaft 44 by the first piston 40. However, in other embodiments, the second piston 42 can be configured for selective disconnection from the crankshaft 44 such that the second piston 42 is immobile during operation of the engine 12 in the economy mode.

In one embodiment, the controller 80 can operate the engine 12 in either the standard mode or the economy mode depending upon certain vehicular operating conditions. For example, during acceleration or other increased loading of the engine 12, the engine 12 can operate in the standard mode to ensure that the vehicle 10 is sufficiently powered. However, when the loading of the engine 12 is decreased (e.g., operation of the vehicle 10 at steady speed on substantially flat roadway), the controller 80 can deactivate the second cylinder bank 24 (e.g., facilitate operation of the engine 12 in the economy mode) to conserve fuel and/or energy.

Figure 6:
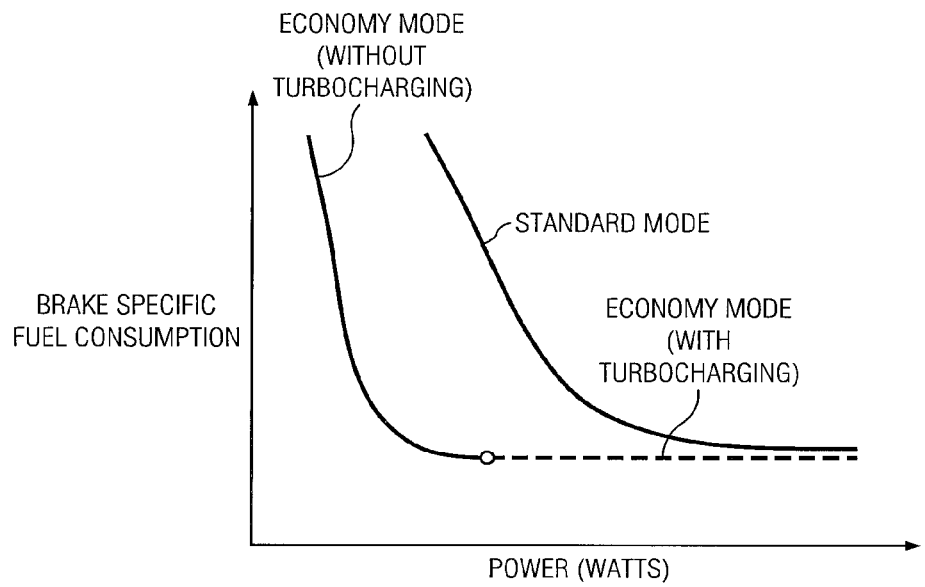
FIG. 6 is a graph depicting the relationship between brake specific fuel consumption and power for each of a standard mode of operation and an economy mode of operation of the engine.

As illustrated in FIG. 6, the engine 12 can operate in the economy mode (e.g., during low load), to facilitate more effective brake specific fuel consumption (BSFC) than could otherwise be achieved by operating the engine 12 in the standard mode. In addition, when the engine 12 is operating in the economy mode, the first turbocharger 26 can turbocharge the first cylinder bank 22 to impart additional power (e.g., as illustrated by the dashed line in FIG. 6) to the vehicle 10 without sacrificing BSFC. Therefore, at higher engine power, the BSFC of the engine 12 in the economy mode can be comparable to the BSFC of the engine 12 in the standard mode.

The controller 80 can be configured to operate each of the first valve 122 and the second valve 124 in response to whether the engine 12 is operating in either of the economy mode or the standard mode. In one embodiment, the controller 80 can vary its control of the first and second valves 122, 124 depending upon whether the engine 12 is operating in either the standard mode or the economy mode. For example, when the engine 12 is operating in the standard mode, the controller 80 can be configured to place the first valve 122 in the opened position and place the second valve 124 in the closed position, as illustrated in FIG. 3. As described above, pressurized fluid from the second turbocharger 28 can thus be provided into the body 30 of the intake manifold 20 to facilitate turbocharging of the second cylinder bank 24.

It will be appreciated that, when the engine 12 operates in the economy mode, the second turbocharger 28 can be inactive (e.g., exhaust fluid from the second cylinder 38 is insufficient to power the turbine 106 for increasing the flow of fluid into the second flow passage 34). However, since the first turbocharger 26 can remain operational to continue turbocharging the active first cylinder bank 22, pressurized fluid can still flow into the body 30 of the intake manifold 20 from the first turbocharger 26.

In one embodiment, the body 30 of the intake manifold 20 can be configured such that the first and second flow passages 32, 34 are in fluid communication with one another. In such an embodiment, when the first and second turbochargers 26, 28 are operating (e.g., the engine 12 is operating in the standard mode), operation of the compressors 88, 108 can be sufficient to prevent backfeed into either of the first or second flow passages 32, 34 (e.g., "cross-talk" between the first and second turbochargers 26, 28). However, once the second turbocharger 28 becomes inactive (e.g., the engine 12 is in the economy mode), pressurized fluid from the first turbocharger 26 can backfeed into the second flow passage 34. If the pressurized fluid were permitted to enter the compressor output port 116, the compressor 108 could be reverse spooled which could hinder proper operation of the second turbocharger 28 when the second cylinder bank 24 is subsequently activated (e.g., by delaying proper operation of the second turbocharger 28 and affecting overall performance of the engine 12). Therefore, when the engine 12 is operating in the economy mode, the controller 80 can be configured to place the first and second valves 122, 124 into their closed positions, as illustrated in FIG. 7, to prevent fluid from backfeeding into the compressor output port 116 and to prevent the compressor 108 from being reverse spooled.

In one embodiment, as the engine 12 is in process of transitioning from the economy mode to the standard mode, the controller 80 can be configured to temporarily move the second valve 124 away from the closed position while the first valve 122 remains in the closed position, as illustrated in FIG. 8. Although the second valve 124 is shown to be moved in a fully opened position, it will be appreciated that the second valve 124 can moved away from the closed position into any position (e.g., 20% opened) that permits fluid to flow past the second valve 124. Pressurized fluid from the first turbocharger 26 can backfeed into the second flow passage 34, flow through the bypass flow passage 120, and flow into the compressor input port 114 to forward spool the compressor 108. As illustrated in FIG. 8, the check valve 119 can be biased into the closed position (e.g., by the spring) and can prevent pressurized fluid from escaping from the compressor input port 114. In one embodiment, the second turbocharger 28 can additionally include a blow-off valve (e.g., located at the compressor output port 116) that permits the pressurized fluid to escape from the second turbocharger 28 during forward spooling of the compressor 108.

Once the second cylinder bank 24 is activated (e.g., combustion begins occurring within the second cylinder 38), the exhaust fluid from the second cylinder 38 can facilitate operation of the turbine 106 to further operate the compressor 108 in the direction of the forward spooling. It will be appreciated that forward spooling the compressor 108 in this manner can effectively reduce the "turbo lag" of the second turbocharger 28 (e.g., the time required to bring the second turbocharger 28 up to a speed where it can function effectively). It will also be appreciated that, when the turbine 106 and the compressor 108 are rigidly coupled together, the turbine 106 and compressor 108 can rotate together during forward spooling of the compressor 108. With the turbine 106 already in motion, exhaust fluid might flow across the turbine 106 more effectively and might encounter less initial disturbance than if the turbine 106 were initially at rest. Accordingly, the exhaust fluid may be less susceptible to reverberation which can improve overall performance of the vehicle 10.

In one embodiment, as the engine 12 is in process of transitioning from the economy mode to the standard mode, the controller 80 can be configured to facilitate operation of the second spark plug 79 according to the retarded timing schedule. When the ignition timing of the second spark plug 79 is retarded, the exhaust fluid discharged from the second cylinder 38 into the exhaust port 70 can be more heated than is typical of exhaust fluid (e.g., when the second spark plug 79 is controlled according to the normal timing schedule described above). The more heated exhaust fluid can cause the turbine 106 to respond more quickly, and can resultantly reduce the "turbo lag" of the second turbocharger 28.

Although the first and second cylinder banks 22, 24 are shown and described above as having distinct banks that are disposed upon respective left and right sides of the engine 12, it will be appreciated that cylinders of an engine can be provided in any of a variety of cylinder bank arrangements. For example, an engine can comprise six cylinders that are substantially longitudinally aligned along an engine (e.g., a straight-6). In such an arrangement, the first bank can comprise first, third, and fifth cylinders and the second bank can comprise second, fourth, and sixth cylinders. In another example, an engine can comprise eight cylinders that are arranged in a W-type configuration (e.g., a W8). In such an arrangement, the first bank can comprise the two leftmost banks and the second bank can comprise the two rightmost banks.

The foregoing description of embodiments and examples has been presented for purposes of illustration and description. It is not intended to be exhaustive or to limit the invention to the forms described. Numerous modifications are possible in light of the above teachings. Some of those modifications have been discussed, and others will be understood by those skilled in the art. The embodiments were chosen and described in order to best illustrate various embodiments as are suited to the particular use contemplated. It is hereby intended that the scope of the invention be defined by the claims appended hereto.

What is claimed is:

1. A system of a turbocharged internal combustion engine, the system comprising:
   an intake manifold having an input and an output;
   a first cylinder bank in fluid communication with the output of the intake manifold;
   a second cylinder bank in fluid communication with the output of the intake manifold;
   a first turbocharger associated with the first cylinder bank and in fluid communication with each of an ambient air source and the input of the intake manifold;
   a second turbocharger associated with the second cylinder bank and having a compressor input port and a compressor output port, the compressor input port being in fluid communication with an ambient air source;
   a flow passage in fluid communication with each of the compressor output port and the input of the intake manifold;
   a bypass flow passage in fluid communication with each of the compressor input port and the input of the intake manifold;

a first valve disposed at least partially within the flow passage and located between the bypass flow passage and the compressor output port, the first valve being movable between an opened position and a closed position; and a second valve disposed at least partially within the bypass flow passage and located between the flow passage and the ambient air source, the second valve being movable between an opened position and a closed position, wherein in the closed position, the second valve prevents fluid communication between the compressor output port and the compressor input port through the bypass flow passage.

2. The system of claim 1 wherein the first valve and the second valve each comprises a respective butterfly valve.

3. The system of claim 1 further comprising a controller, wherein the controller is electrically coupled with the engine, the first valve, and the second valve, the controller facilitates selective operation of the engine in one of an economy mode and a standard mode in response to changes in engine loading, and the controller selectively actuates respective ones of the first valve and the second valve in response to operation of the engine in one of the economy mode and the standard mode.

4. The system of claim 3 wherein, when the engine is in the standard mode:
   each of the first cylinder bank and the second cylinder bank is enabled;
   the first valve is in the opened position; and
   the second valve is in the closed position.

5. The system of claim 3 wherein, when the engine is in the economy mode:
   the first cylinder bank is enabled;
   the second cylinder bank is disabled; and
   the first valve and the second valve are in the respective closed positions.

6. The system of claim 3 wherein, when the engine is in process of transitioning from the economy mode to the standard mode, the controller facilitates temporary movement of the second valve away from the closed position.

7. The system of claim 3 wherein:
   the engine further comprises:
      a first fuel injector and a first spark plug, each associated with the first cylinder bank and electrically coupled with the controller; and
      a second fuel injector and a second spark plug, each associated with the second cylinder bank and electrically coupled with the controller; and
   the controller facilitates selective operation of each of the first fuel injector, the first spark plug, the second fuel injector, and the second spark plug.

8. The system of claim 7 wherein the controller facilitates operation of the second spark plug according to a retarded timing schedule when the engine is in process of transitioning from the economy mode to the standard mode.

9. The system of claim 8 wherein the controller facilitates disablement of the second spark plug and the second fuel injector when the engine is operating in the economy mode.

10. A vehicle comprising:
   an engine comprising:
      an intake manifold comprising a body, a first flow passage, and a second flow passage, wherein the body, the first flow passage, and the second flow passage are each in fluid communication with one another;
      a first cylinder bank comprising a plurality of first cylinders and defining a first intake port and a first exhaust port for each first cylinder, each first intake port being in fluid communication with the body of the intake manifold;
      a first turbocharger comprising:
         a first compressor input port in fluid communication with an ambient air source;
         a first compressor output port in fluid communication with the first flow passage of the intake manifold;
         a first compressor associated with the first compressor input port and the first compressor output port;
         a first turbine input port in fluid communication with each first exhaust port of the first cylinder bank;
         a first turbine output port; and
         a first turbine coupled with the first compressor and associated with the first turbine input port and the first turbine output port;
      a second cylinder bank comprising a plurality of second cylinders and defining a second intake port and a second exhaust port for each second cylinder, each second intake port being in fluid communication with the body of the intake manifold;
      a second turbocharger comprising:
         a second compressor input port in fluid communication with an ambient air source;
         a second compressor output port in fluid communication with the second flow passage of the intake manifold;
         a second compressor associated with the second compressor input port and the second compressor output port;
         a second turbine input port in fluid communication with each second exhaust port of the second cylinder bank;
         a second turbine output port; and
         a second turbine coupled with the second compressor and associated with the second turbine input port and the second turbine output port; and
      a bypass flow passage in fluid communication with the second flow passage of the intake manifold and the second compressor input port of the second turbocharger;
      a first valve disposed at least partially within the second flow passage of the intake manifold and located between the bypass flow passage and the second compressor output port of the second turbocharger, the first valve being movable between an opened position and a closed position; and
      a second valve disposed at least partially within the bypass flow passage and movable between an opened position and a closed position, wherein in the closed position, the second valve prevents fluid communication between the second compressor output port and the second compressor input port through the bypass flow passage; and
   a controller electrically coupled with the engine, the first valve, and the second valve, wherein the controller facilitates selective operation of the engine in one of an economy mode and a standard mode in response to changes in engine loading, and wherein the controller actuates respective ones of the first valve and the second valve between the respective opened and closed positions.

11. The vehicle of claim 10 wherein the first valve and the second valve each comprises a respective butterfly valve.

12. The vehicle of claim 10 wherein the controller facilitates operation of respective ones of the first valve and the second valve in response to operation of the engine in one of the economy mode and the standard mode.

13. The vehicle of claim 12 wherein, when the engine is in the standard mode:
- each of the first cylinder bank and the second cylinder bank is enabled;
- the first valve is in the opened position; and
- the second valve is in the closed position.

14. The vehicle of claim 12 wherein, when the engine is in the economy mode:
- the first cylinder bank is enabled;
- the second cylinder bank is disabled; and
- the first valve and the second valve are in the respective closed positions.

15. The vehicle of claim 12 wherein, when the engine is in process of transitioning from the economy mode to the standard mode, the controller facilitates temporary movement of the second valve away from the closed position.

16. The vehicle of claim 15 wherein:
the engine further comprises:
- a first fuel injector and a first spark plug, each associated with the first cylinder bank and electrically coupled with the controller; and
- a second fuel injector and a second spark plug, each associated with the second cylinder bank and electrically coupled with the controller; and the controller facilitates selective operation of each of the first fuel injector, the first spark plug, the second fuel injector, and the second spark plug.

17. The vehicle of claim 16 wherein the controller facilitates operation of the second spark plug according to a retarded timing schedule when the engine is in process of transitioning from the economy mode to the standard mode.

18. The vehicle of claim 17 wherein the controller facilitates disablement of the second spark plug and the second fuel injector when the engine is in the economy mode.

19. The vehicle of claim 10 wherein the first cylinder bank comprises three first cylinders and the second cylinder bank comprises three second cylinders.

* * * * *